(12) United States Patent
Fuse et al.

(10) Patent No.: US 6,729,920 B2
(45) Date of Patent: May 4, 2004

(54) COUPLER MOUNTING STRUCTURE FOR VESSELS

(75) Inventors: Tomohiro Fuse, Saitama (JP); Masahiko Tsuchiya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/238,578

(22) Filed: Sep. 11, 2002

(65) Prior Publication Data
US 2003/0060098 A1 Mar. 27, 2003

(30) Foreign Application Priority Data
Sep. 18, 2001 (JP) ........................................ 2001-284061

(51) Int. Cl.[7] ............................................. B63H 23/34
(52) U.S. Cl. ........................................................ 440/83
(58) Field of Search ............................ 464/901; 440/83

(56) References Cited

U.S. PATENT DOCUMENTS

| | | | | |
|---|---|---|---|---|
| 4,568,310 A | * | 2/1986 | deMey, II ..................... | 464/29 |
| 4,588,323 A | * | 5/1986 | Vollmer et al. ................ | 403/12 |
| 5,139,460 A | * | 8/1992 | Hoyt et al. .................... | 464/88 |
| 5,713,768 A | * | 2/1998 | Jones ............................ | 440/38 |
| 5,823,703 A | * | 10/1998 | Thomas et al. .............. | 403/373 |
| 6,203,435 B1 | * | 3/2001 | Falgout, Sr. ................... | 464/18 |
| 6,231,450 B1 | * | 5/2001 | Korus ............................. | 464/74 |
| 6,470,560 B1 | * | 10/2002 | Wanner et al. ............. | 29/525.11 |

FOREIGN PATENT DOCUMENTS

JP      2542418      4/1997

* cited by examiner

Primary Examiner—Stephen Avila
(74) Attorney, Agent, or Firm—Birch, Stewart, Kolasch & Birch, LLP (57) ABSTRACT

An impeller drive shaft in a vessel is supported on a vessel body at a midsection thereof by a bearing member. A driven side coupler to be coupled with a drive side coupler on the side of an engine output shaft is mounted on a front end of the impeller driving shaft, a collar having a diameter larger than the maximum diameter D of the shaft is detachably mounted on the rear of the mounting portion for the driven side coupler on the impeller driving shaft, and the driven side coupler is fixed with respect to the shaft so as not to be capable of movement from axial thrust by an abutment between the collar and the driven side coupler. The collar may also be divided into two or more pieces with respect to the circumferential direction. The aforementioned arrangement improves durability of the shaft at the mounting portion for the driven side coupler and facilitates ease of maintenance.

18 Claims, 9 Drawing Sheets

COUPLER MOUNTING STRUCTURE FOR VESSELS

CROSS-REFERENCES TO RELATED APPLICATIONS

This nonprovisional application claims priority under 35 U.S.C. §119(a) on Patent Application No. 2001-284061 filed in Japan on Sep. 18, 2001, the entirety of which is herein incorporated by reference.

BACKGROUND OF THE INVENTION

1. Field of the Invention

The present invention relates to a coupler mounting structure for vessels, and more particularly to a mounting structure of a driven side coupler coupled with a front end of an impeller driving shaft of the vessel.

2. Description of the Background Art

Figure 8:
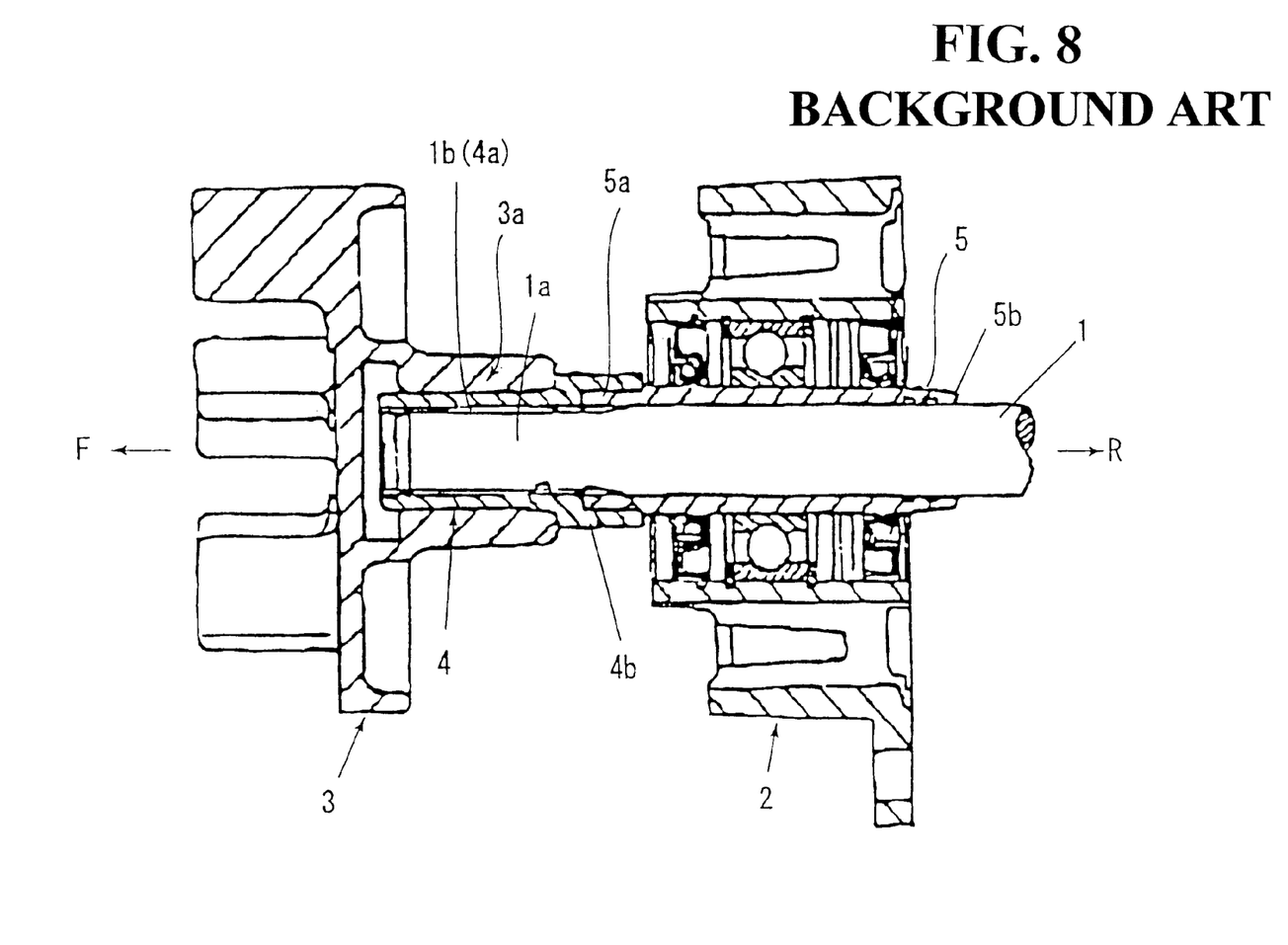
FIG. 8 is a view of an exemplary structure of the background art.
Figure 9:
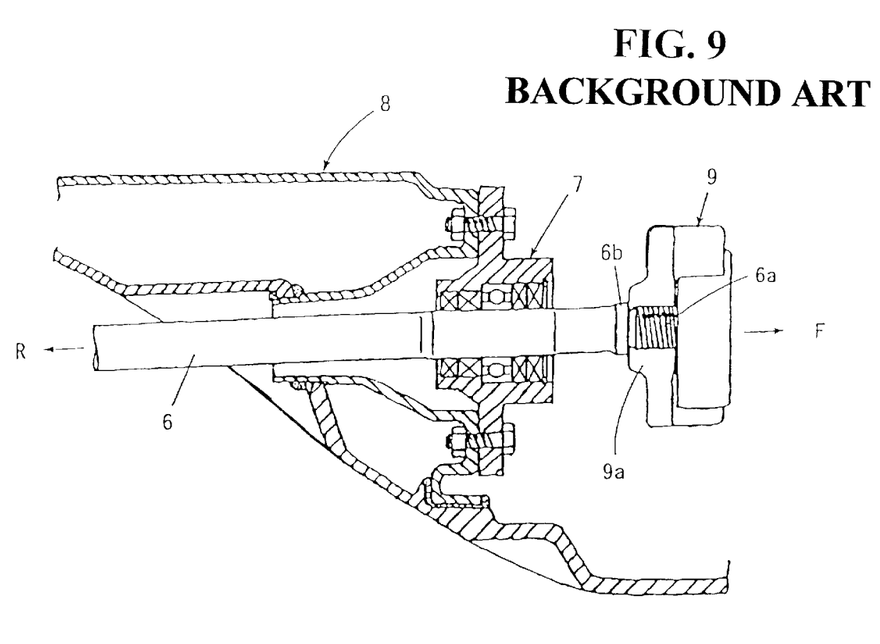
FIG. 9 is a view of an exemplary structure of the background art.

In the background art, coupler mounting structures for vessels as shown in FIG. 8 (Japanese Patent Laid-Open No. 112679/1995) and in FIG. 9 (Japanese Utility Model Registration No. 2542418) are known. The entirety of each of the aforementioned references are hereby incorporated by reference.

In the structure shown in FIG. 8, the midsection of the impeller driving shaft 1 in the vessel is supported on the vessel body via a bearing member 2, and the driven side coupler 3 to be coupled with a coupler (not shown) on the side of the output shaft of the engine is mounted on the front end 1a of the shaft 1. The shaft 1 is formed with a spline 1b at the front end 1a, and a cylindrical torque transmission member 4 is fixed in a boss 3a on the driven side coupler 3 by welding. The spline 4a formed on the inner peripheral surface of the torque transmission member 4 engages with the spline 1b of the aforementioned shaft 1. The shaft 1 is supported by the bearing member 2 via a sleeve 5, and the front end 5a of the sleeve 5 and the rear end 4b of the torque transmission member 4 are fixed by welding. Since the shaft 1 and the torque transmission member 4 fixed to the driven side coupler 3 are spline-connected with this type of structure, the shaft 1 can be pulled out rearward of the vessel body (toward the impeller which is not shown in the direction shown by the arrow R).

In the structure shown in FIG. 9, the midsection of the impeller driving shaft 6 in the vessel is supported on the vessel body 8 via a bearing member 7, and the driven side coupler 9 to be coupled with the coupler (not shown) on the side of the output shaft of the engine is mounted on the front end 6a of the shaft 6. The shaft 6 is formed with a thread at the front end 6a, e.g., at the mounting portion for the driven side coupler 9, and the boss 9a of the driven side coupler 9 is also formed with a thread on the inner surface thereof. The shaft 6 is formed with a flange portion 6b integrally at the rear portion of the mounting portion 6a for the driven side coupler 9. Therefore, with this type of structure, the driven side coupler 9 can be fixedly mounted on the shaft 6 by screwing the driven side coupler 9 on the front end 6a of the shaft 6 until it abuts against the flange portion 6b.

In the structure of the background art shown in FIG. 8, since the shaft 1 and the torque transmission member 4 fixed to the driven side coupler 3 are engaged only by a spline, the shaft 1 and the torque transmission member 4 fixed to the driven side coupler 3 are capable of relative movement in the thrust direction at this spline-engaged portion. Since the reaction force from the impeller (not shown) is exerted on the shaft 1 discontinuously and indefinitely in strength, the shaft 1 and the torque transmission member 4 fixed to the driven side coupler 3 vibrates relatively at the spline-engaged portion in the thrust direction by the action of the reaction force, and thus both spline portions are susceptible to wear. Therefore, in the structure of the background art shown in FIG. 8, there is a problem in that durability at the connecting portion between the shaft 1 and the driven side coupler 3 is not necessarily good.

In the structure shown in FIG. 9, since the driven side coupler 9 can be fixedly mounted to the shaft 6, durability at the mounting portion is improved. However, since the shaft 6 is formed with the flange portion 6b integrally therewith, the shaft 6 cannot be pulled out rearwardly of the vessel body (toward the impeller in the direction of the arrow R). Therefore, when replacing the shaft 6 for maintenance, it is necessary to remove the impeller (not shown) at the rear end first, and then pull the shaft 6 out toward the front (in the direction shown by the arrow F). However, since there is a drive side coupler and an engine forwardly thereof, the engine must be removed before pulling the shaft 6 out. In other words, in the structure shown in FIG. 9, there is a problem in that it is troublesome to perform maintenance on the shaft 6.

SUMMARY OF THE INVENTION

The present invention overcomes the shortcomings associated with the background art and achieves other advantages not realized by the background art.

An object of the present invention is to provide a coupler mounting structure for vessels in which the above-described problems identified by the inventors are solved.

An object of the present invention is to provide a coupler mounting structure with improved shaft durability at the mounting portion for the driven side coupler.

An object of the present invention is to provide for easy and reliable maintenance of a coupler mounting structure.

One or more of these and other objects are accomplished by a coupler mounting structure for vessels in which an impeller driving shaft in the vessel is supported on a midsection of a vessel body by a bearing member and driven by an output shaft of an engine, the coupler mounting structure comprising a driven side coupler being mounted on a front end of the impeller driving shaft; a drive side coupler being operatively engaged with the driven side coupler for transmitting a driving force from the engine output shaft; and a collar having a diameter larger than a maximum diameter of the impeller driving shaft, the collar being detachably mounted on the impeller driving shaft on a rear side of a mounting portion for the driven side coupler, wherein the driven side coupler is operatively engaged and fixed with respect to the impeller driving shaft by an abutment between the collar and the driven side coupler preventing an axial movement responsive to thrust on the impeller driving shaft.

One or more of these and other objects are further accomplished by a coupler mounting structure for a vessel comprising an impeller driving shaft supported on a midsection of a vessel body by a bearing member and driven by an output shaft of an engine; a driven side coupler being mounted on a front end of the impeller driving shaft with a mounting portion; a drive side coupler being operatively engaged with the driven side coupler for transmitting a driving force from the engine output shaft; a collar having a diameter larger than a maximum diameter of the impeller driving shaft, the collar being detachably mounted on the impeller driving shaft on a rear side of the mounting portion for the driven side coupler, wherein the driven side coupler is operatively engaged and fixed with respect to the impeller driving shaft by an abutment between the collar and the driven side coupler preventing an axial movement responsive to thrust on the impeller driving shaft.

In the coupler mounting structure for vessels according to the above, relative movement (and thus relative vibration) between the shaft and the driven side coupler at the mounting portion of the driven side coupler does not occur, and durability is improved at the mounting portion of the driven side coupler. In addition, since the diameter of the collar is larger than the maximum diameter of the shaft, the driven side coupler can be fixedly secured with respect to the shaft by this collar. Since the collar is detachably mounted on the shaft, the shaft can be pulled out rearward of the vessel body by removing the driven side coupler and the collar from the shaft. Accordingly, maintenance of the shaft can be performed easily. If the collar is divided two or more pieces in the circumferential direction, the collar can easily be removed from the shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIGS. 6(a)–(c) are views of the driven side coupler, in which

FIGS. 7(a)–(b) are views of a portion of the coupler mounting structure for vessels according to a second embodiment of the present invention, in which

DETAILED DESCRIPTION OF THE PREFERRED EMBODIMENTS

Figure 1:
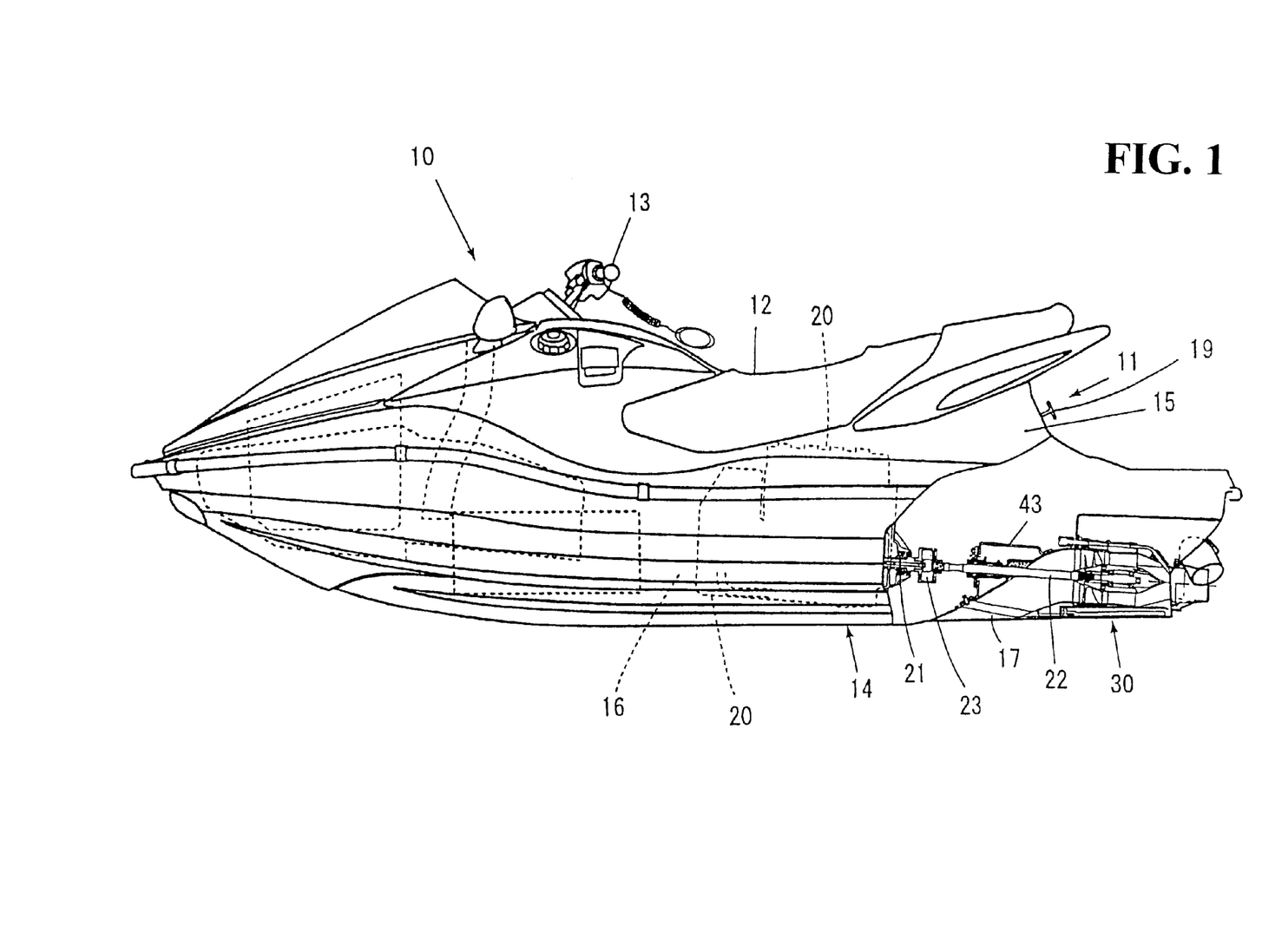
FIG. 1 is a partial, side view of an example of a small planing vessel employing a coupler mounting structure according to a first embodiment of the present invention.
Figure 2:
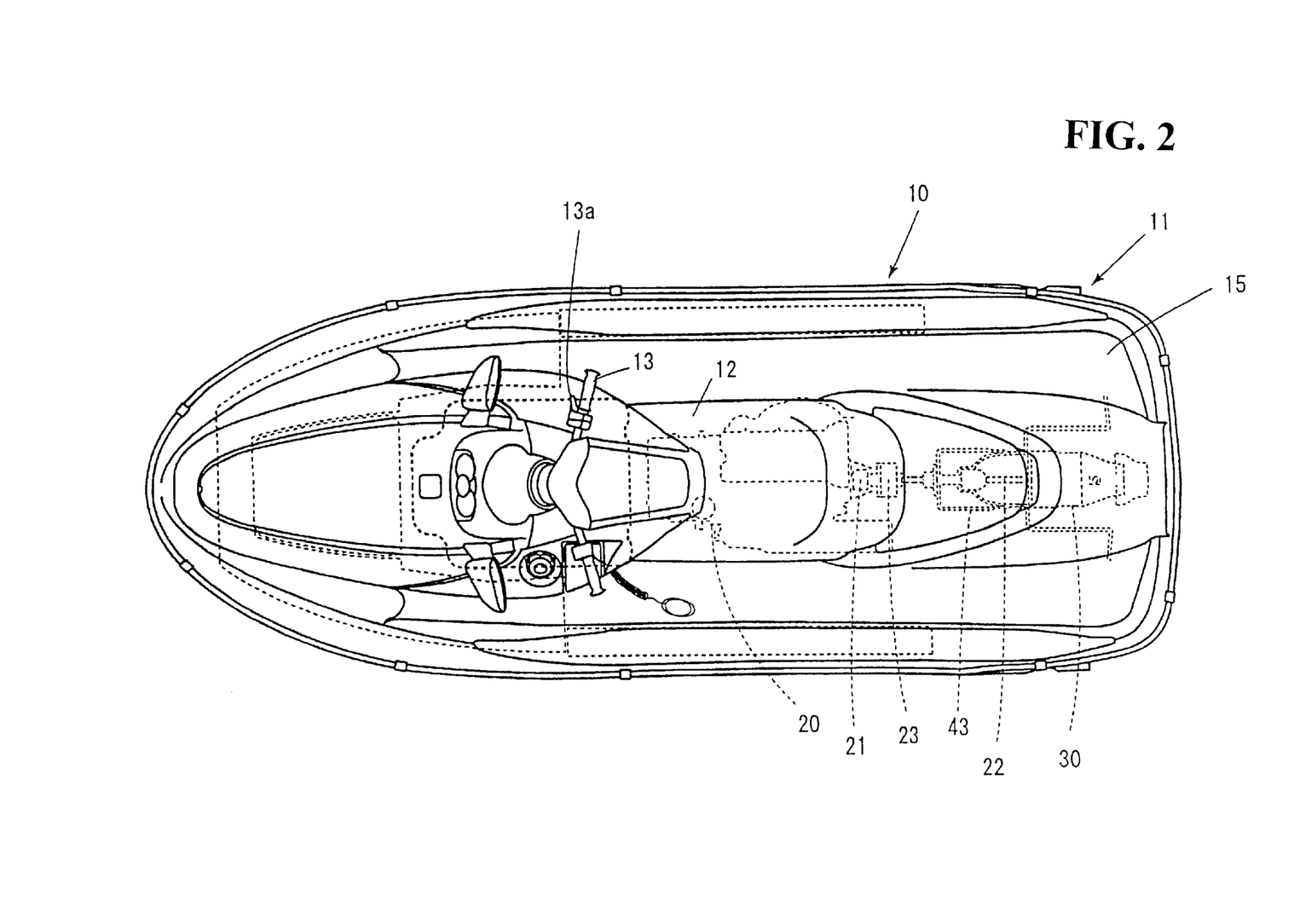
FIG. 2 is a schematic plan view of the small planning vessel of FIG. 1.
Figure 3:
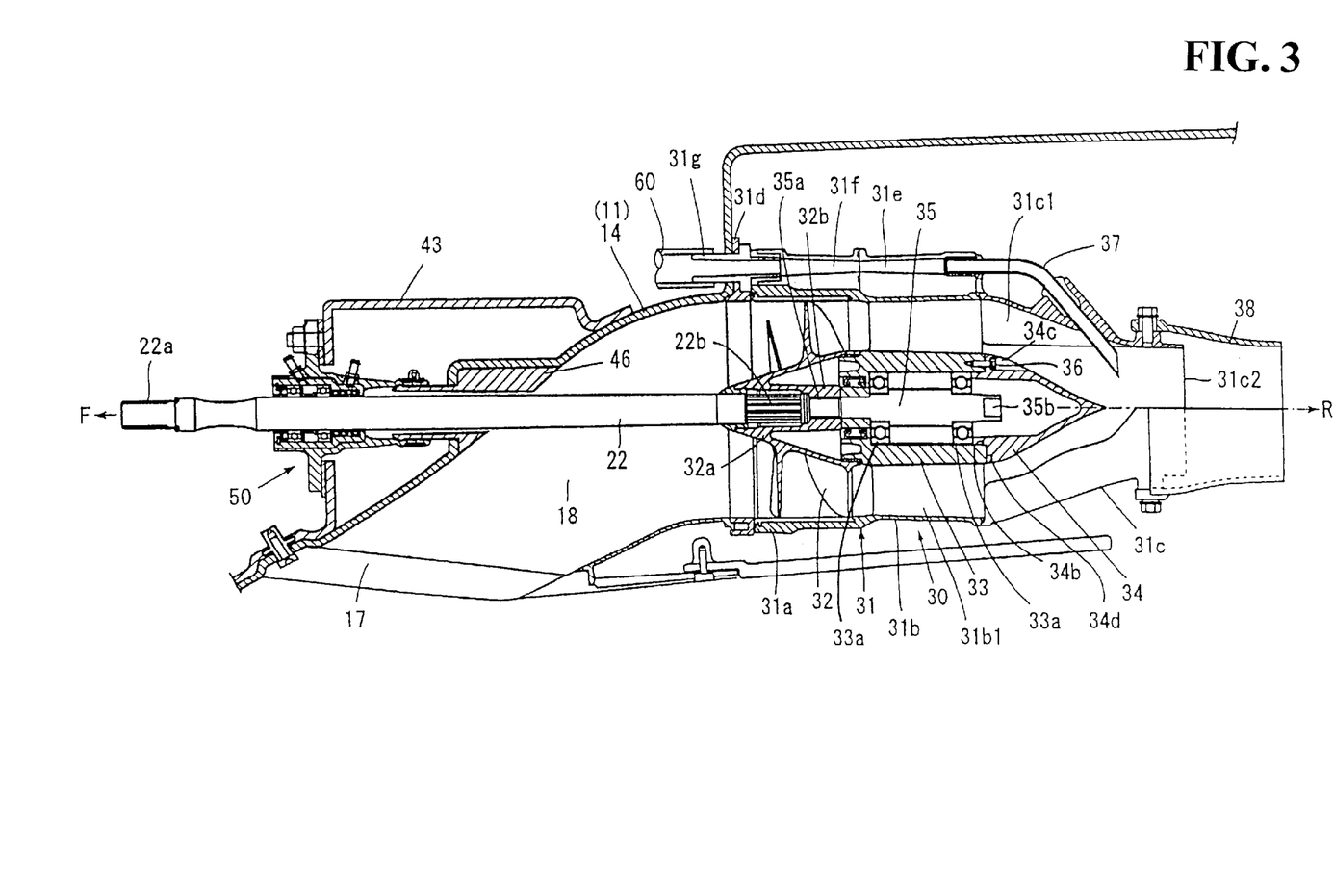
FIG. 3 is a cross sectional view of a supporting structure of a jet pump and a shaft.
Figure 4:
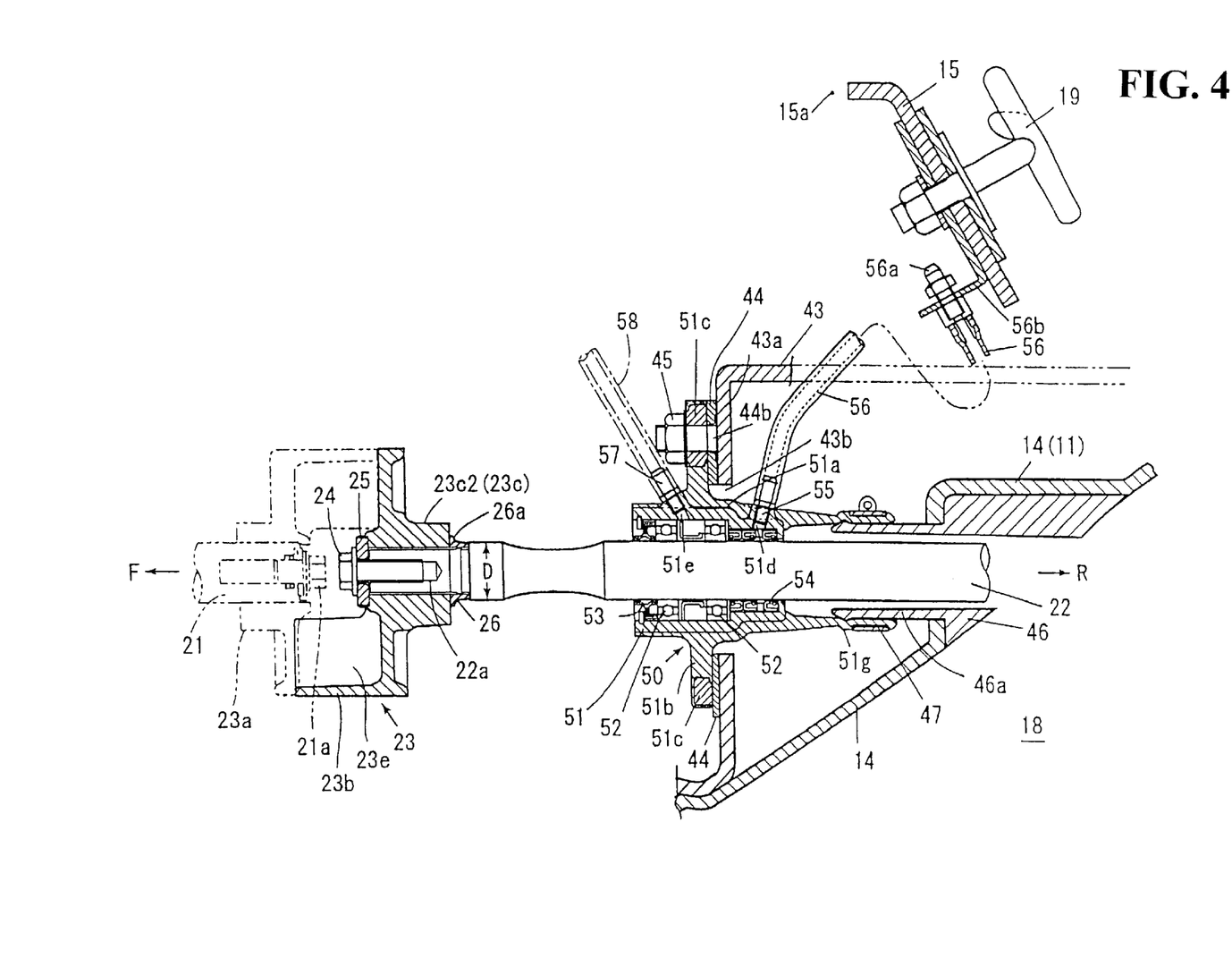
FIG. 4 is a partially enlarged view of FIG. 3.
Figure 5:
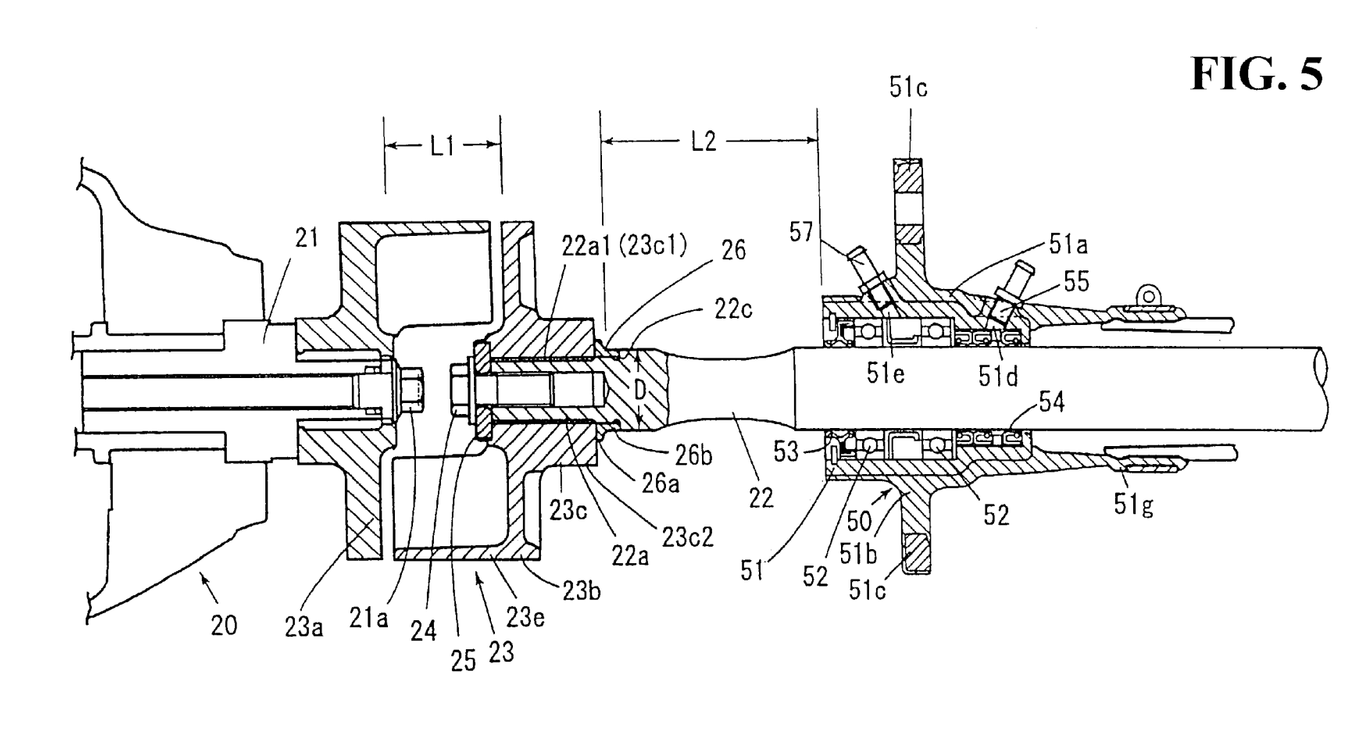
FIG. 5 is a cross sectional view of a coupler mounting structure.
Figures 6A, 6B:
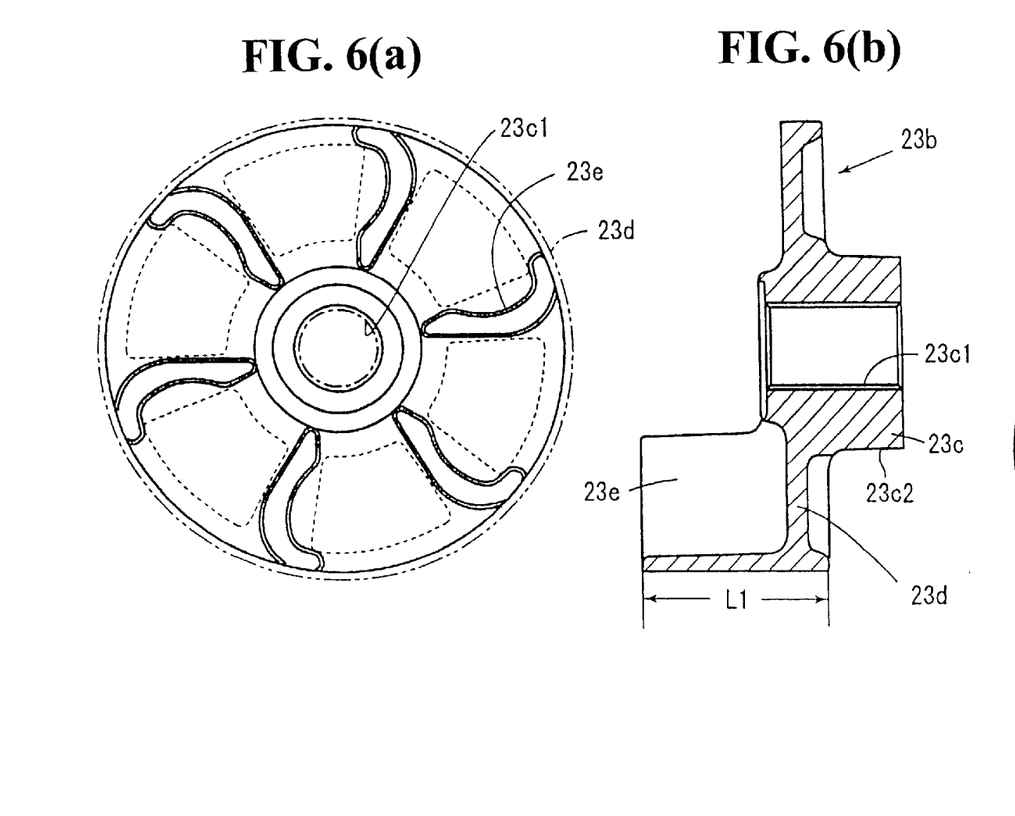
FIG. 6(a) is a partially omitted front view (as seen from the front in the traveling direction of the vessel)
FIG. 6(b) is a cross sectional side view (cross section taken along the line b—b in the FIG. 6(c))
Figure 6C:
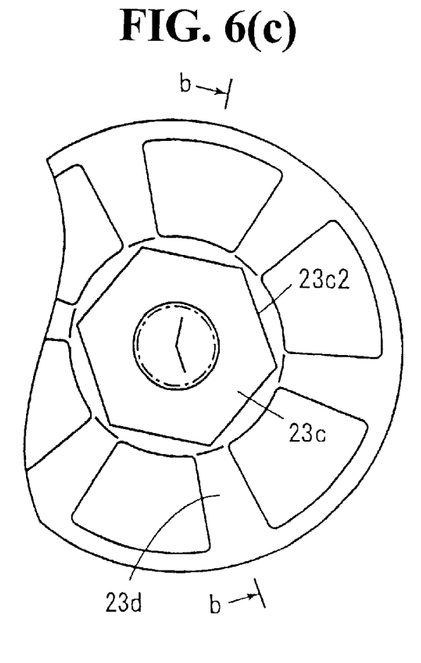
FIG. 6(c) is a partially omitted rear view.
Figure 7A:
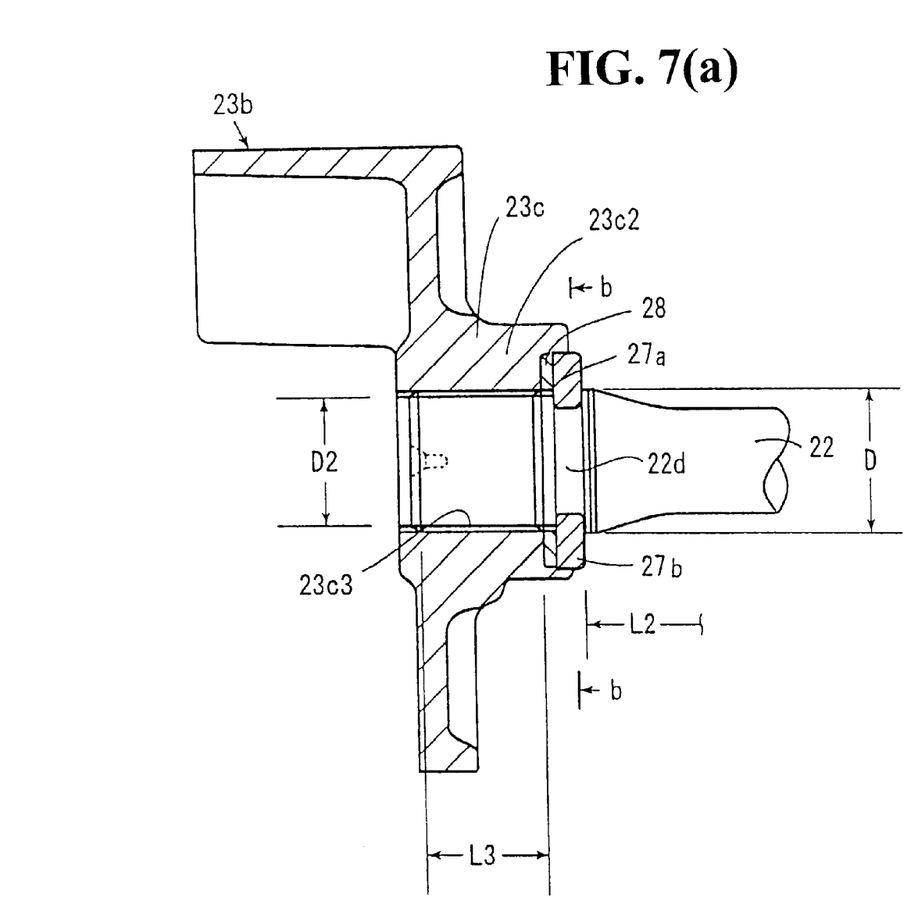
FIG. 7(a) is a side cross sectional view.
Figure 7B:
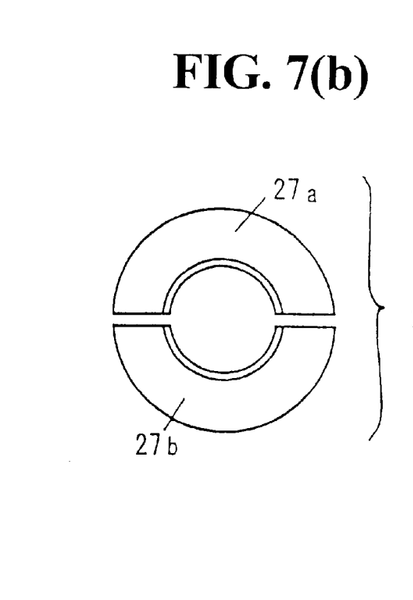
FIG. 7(b) is a cross sectional view taken along the line b—b only of the collar portion in the FIG. 7(a)

The present invention will hereinafter be described with reference to the accompanying drawings. FIG. 1 is a partial, side view of an example of a small planing boat employing a coupler mounting structure according to a first embodiment of the present invention. FIG. 2 is a schematic plan view of the small planning boat of FIG. 1. FIG. 3 is a cross sectional view of a supporting structure of a jet pump 30 and a shaft 22. FIG. 4 is a partially enlarged view of FIG. 3. FIG. 5 is a cross sectional view of a coupler mounting structure. FIGS. 6(a)–(c) are views of the driven side coupler 23b, in which FIG. 6(a) is a partially omitted front view (as seen from the front in the traveling direction of the vessel), FIG. 6(b) is a cross sectional side view (cross section taken along the line b—b in the FIG. 6(c)), and FIG. 6(c) is a partially omitted rear view. FIGS. 7(a)–(b) are view of a portion of the coupler mounting structure for vessels according to a second embodiment of the present invention, in which FIG. 7(a) is a side cross sectional view, FIG. 7(b) is a cross sectional view taken along the line b—b only of the collar portion in the FIG. 7(a);

FIG. 1 is a schematic side view partially broken showing an example of the small planing boat employing a first embodiment of the coupler mounting structure for vessels according to the present invention, and FIG. 2 is a schematic plan view of the same. As shown in these figures (mainly in FIG. 1), a small planing boat 10 is a small craft of the saddle riding type. An occupant may sit on a seat 12 on a vessel body 11, and hold a steering handle 13 with throttle lever for controlling travel. The vessel body 11 is a floating body structure formed by joining a hull 14 and a deck 15 to define a space 16 therein. In the space 16, an engine 20 is mounted on the hull 14, and a jet pump (jet propelling pump) 30 driven by the engine 20 is mounted on the rear portion of the hull 14.

The jet pump 30 (See FIG. 3) includes an impeller 32 disposed in a flow path 18 extending from an intake 17 opened on the ship bottom to a jet flow port 31c2 opened at the rear end of the vessel body and a deflector 38, and a shaft (impeller shaft) 22 for driving the impeller 32 is connected to the output shaft 21 (See FIG. 1, FIG. 4) of the engine 20 via a coupler 23 (drive side coupler 23a and driven side coupler 23b shown in FIG. 4, FIG. 5). Therefore, when the impeller 32 is driven and rotated by the engine 20 via the coupler 23 and the shaft 22, water taken through the intake 17 is injected through the jet flow port 31c2 and deflector 38, whereby the vessel body 11 is propelled. The driven number of revolution of the engine 20, or the propelling force by the jet pump 30 is controlled by the turning operation of a throttle lever 13a (See FIG. 2) of the steering handle 13. The deflector 38 cooperatively operates with the steering handle 13 via an operating wire (not shown) and turned by the operation of the handle 13, whereby the course of the vessel body 11 can be changed. In FIG. 1, a towing hook 19 to be used when towing an object to be towed (rubber boat or the like) is fixed at the rear portion of the vessel body 11.

FIG. 3 is a cross sectional view showing a supporting structure of a jet pump 30 and a shaft 22. FIG. 4 is a partially enlarged view of FIG. 3, and FIG. 5 is a cross section showing mainly a coupler mounting structure. As shown in FIG. 3, the jet pump 30 includes a duct 31 forming a flow path 18 in communication with the intake 17 provided at the bottom of the vessel body 11, an impeller 32 disposed in the duct 31, a bearing portion 33 for the impeller provided in the duct 31, and a cap 34 for closing the rear end of this bearing portion 33.

The jet pump 30 is detachably mounted on the hull 14 by fixing a flange portion 31d formed at the front of the duct 31 to the hull 14 by a bolt (not shown). The duct 31 includes an impeller storage 31a, a bearing storage 31b, and a nozzle 31c, and the impeller storage 31a and the bearing storage 31b are integrally formed. The bearing portion 33 is formed integrally with the bearing storage 31b via a stationary blade 31b1. The impeller 32 engages at the front portion of the boss 32a with the spline 22b formed at the rear end of the shaft 22, so as to rotate with the shaft 22. The shaft 22 is, as is described in detail later, connected at its distal end 22a to the output shaft 21 of the engine 20 mounted on the vessel body 11 via the coupler 23 (See FIG. 4, FIG. 5).

A supporting shaft 35 for supporting a rear portion 32b of the boss 32a of the impeller 32 is rotatably supported by the bearing portion 33 via a ball bearing 33a. The distal end of the supporting shaft 35 is formed with a male thread 35a, and the impeller 32 and the supporting shaft 35 are connected by the male thread 35a screwed into the female thread formed on the rear portion 32b of the boss of the impeller 32. Therefore, the impeller 32 is connected at the front portion of the boss 32a to the shaft 22, and the rear portion 32b of the boss is connected to the supporting shaft 35, so as to rotate with the shaft 22 and the supporting shaft 35. The rear end of the supporting shaft 35 is formed with a flat surface portion 35b for enabling engagement of a tool.

The cap 34 is formed at the front portion thereof with an insert (cylindrical portion) 34b to be inserted into the rear of the bearing portion 33, and with three (only one is shown) insertion holes 34c for screws 36. The cylindrical insert 34b is formed with a mounting groove for O-ring (not shown). Therefore, after mounting the O-ring on the insert 34b, and inserting (press-fitting) the insert 34b into the rear portion of the bearing portion 33 as shown in FIG. 3, the cap 34 is attached on the rear portion of the bearing portion 33 with the screw 36.

A partial notch 34d is formed on the cap 34 on the surface that comes into contact with the bearing portion 33, so that the cap 34 can easily be removed by removing the screw 36 and inserting the tip of the tool (for example, a screw driver) into the notch 34d when performing maintenance. The nozzle 31c is formed with a stationary blade 31c1 at a portion of the inner surface facing to the cap 34 so as to extend toward the cap 34.

A bilge pipe 37 for discharging bilge water in the bottom of the vessel body is inserted into the nozzle 31c. The bilge pipe 37 is connected to a pipe 60 for bilge in the vessel body via flow paths 31e, 31f and a joint pipe 31g provided above the duct 31 and the joint pipe 31g. The joint pipe 31g and the pipe 60 for bilge on the side of the jet pump 30 are detachably connected by press fitting, and when removing the jet pump 30 from the hull 14, the pipe 60 for bilge may be removed from the joint pipe 31g.

The deflector 38 described above is rotatably mounted on the rear portion of the nozzle 31c. As shown in FIG. 3 to FIG. 5, the hull 14 is provided with a bearing cover 43 fixed thereon, and a bearing body 50 with a rubber damper is fixed on the bearing cover 43 as a bearing member. The bearing body 50 is for supporting the midsection of the shaft 22 on the vessel body 11. The bearing body 50 includes a rubber body 51 constituting the rubber damper, bearings 52, 52 stored in the body 51, a sealing member (mainly oil seal) 53 integrated at the position closer to the engine with respect to these bearings 52, and a sealing member (mainly water seal) 54 integrated at the position closer to the jet pump 30 (the side of the flow path 18) with respect to the bearing 52.

The rubber body 51 includes a cylindrical portion 51a, and a flange portion 51b integrated with the cylindrical portion 51a, and the bearing 52, the oil seal 53, and the water seal 54 are integrated in the cylindrical portion 51a. The cylindrical portion 51a is formed with a rubber cylindrical portion 51g extending toward the cylindrical portion 46a on the side of the vessel body that will be described later. The flange 51b is provided with a metal reinforcing member 51c integrally therewith. The bearing cover 43 is formed at a front wall 43a thereof with a hole 43b into which the cylindrical portion 51a of the bearing body 50 is inserted, and a ring-shaped base 44 formed of metal is tightly bonded around the hole 43b with adhesive agent. Bolts 44b are integrally attached to the base 44.

The bearing body 50 is fixed to the bearing cover 43 (and thus the vessel body 11) by inserting the rubber cylindrical portion 51g into the hole 43b of the bearing cover 43, and inserting the bolt 44b into the reinforcing member 51c in the flange 51b, screwing a nut 45 on a bolt 44b from the inside of the vessel body, and tightening the flange 51b (and thus its reinforcing member 51c). The rear end of the rubber cylindrical portion 51g is connected to the cylindrical portion 46a of a joint rubber 46, which is adhered tightly to the hull 14 with an adhesive agent from the side of the flow path 18, with a ring shaped clump 47.

The cylindrical portion 51a of the bearing body 50 is formed with a grease supply hole 51d and a breather hole 51e. A grease supply hose 56 is connected to the grease supply hole 51d via a connecting pipe 55, and is provided with a grease nipple 56a at the distal end. The grease nipple 56a is fixed to the deck 15 at the position near the opening 15a that appears when the seat 12 is opened by a fitting 56b together with the above-mentioned towing hook 19 (See FIG. 1). Therefore, by opening the seat 12, grease can be supplied easily to the water seal 54 easily from the grease nipple 56a through the grease supply hose 56. A breather hose (for example, a rubber tube) 58 formed of a resilient body (for example, rubber) is detachably connected to the breather hole 51e via a connecting pipe 57. The distal end of the breather hose 58 is fixed to an appropriate position of the vessel body 11 (the hull 14 or the deck 15) by a fitting.

Therefore, since expanded air and expanded grease generated at the bearing portion (in this case, in the cylindrical portion 51a) are released into the breather hose 58 via the breather hole 51e and the connecting pipe 57, grease is prevented from leaking over the seal member 53 due to increase in internal pressure in the bearing portion. At the time of maintenance, grease can be filled in the bearing portion from the connecting pipe 57 after the breather hose 58 is removed. As shown in FIG. 4 and FIG. 5, and as is described above, the shaft 22 is coupled at the front end portion 22a with the output shaft 21 of the engine 20 mounted on the vessel body 11 via a coupler 23.

The coupler 23 includes a drive side coupler 23a and a driven side coupler 23b. The drive side coupler 23a is detachably fixed to the output shaft 21 of the engine 20 with a bolt 21a, and the driven side coupler 23b is detachably fixed to the front end portion 22a of the shaft 22 with a bolt 24. FIGS. 6(a)–(c) are views of the driven side coupler 23b, in which (a) is a partially omitted front view (as seen from the front in the traveling direction of the vessel), (b) is a cross sectional side view (cross section taken along the line b—b in the figure (c)), and (c) is a partially omitted back view (as seen from the rear side of the vessel body).

The driven side coupler 23b includes a boss 23c, a flange 23d formed integrally with the boss 23c, and a engaging portion 23e formed integrally with the flange 23d so as to project toward the driven side coupler 23a. The boss 23c is formed on the inner surface thereof with a spline 23c1 to be engaged with the spline 22a1 (See FIG. 5) formed on the outer periphery of the front end portion 22a of the shaft 22, and an outer peripheral surface 23c2 of the boss 23c is formed into the shape of a hexagonal nut.

Therefore, the driven side coupler 23b is detachably and fixedly secured to the front end of the shaft 22 by engaging the spline 23c1 in the boss 23c of the driven side coupler 23b with the spline 22a1 formed at the front end portion of the shaft 22 and tightening with a bolt 24 via a washer 25, as shown in FIG. 5. The tightening operation can be easily done by holding the hexagonal nut portion 23c2 of the boss 23c.

The drive side coupler 23a is the same as the driven side coupler 23b in its basic shape (symmetrical with respect to the fore-and-aft direction), and is detachably fixed to the output shaft 21 of the engine 20 by the bolt 21a as is described above. A coupler rubber body (shock absorbing body) (not shown, but integrally fits between elements 23a and 23b in FIG. 5) is interposed between the drive side coupler 23a and the driven side coupler 23b, and the engaging portions 23e of both couplers engage with each other via the coupler rubber.

As shown in FIG. 5, a collar 26 is detachably mounted at the rear of the mounting portion (22a) for the driven side coupler 23b of the shaft 22. The collar 26 is a cylindrical body having a flange 26a at the front thereof, and is mounted to the shoulder 22c of the shaft 22 from the distal end of the shaft 22. The diameter of the flange 26a is larger than the maximum diameter D of the shaft 22. The driven side coupler 23b is fixed to the front end of the shaft 22 by the steps of mounting the collar 26 on the shaft 22, engaging the spline 23c1 of the boss 23c with the spline 22a1 of the front end portion of the shaft, and then tightening with the bolt 24 via the washer 25.

In the fixed state, the boss 23c of the driven side coupler 23b is secured between the washer 25 (head portion of the bolt 24) and the collar 26, and the shaft 22 is fixed so as not to be movable with respect to the thrust direction of the shaft. The front surface of the boss 23c is abutted against the washer 25 and the rear surface of the boss 23c is abutted against the flange 26a of the collar 26. The rear end 26b of the collar 26 abuts against the shoulder 22c of the shaft 22.

The distance L2 from the flange (the portion larger than the shaft 22 in diameter) 26a of the collar 26 to the front end of the bearing body 50, e.g., the distance which the shaft 22 can be moved rearward in the direction shown by the arrow R with the driven side coupler 23b and the collar 26 mounted thereon is longer than the length L1 (See FIG. 6(b)) of the engaging portion 23e of the driven side coupler 23b. This arrangement permits uncoupling of the couplers 23a, 23b when the shaft 22 is moved rearward.

When maintenance, for example replacement of a component on the shaft such as the shaft 22 or the coupler 23, is required in the small planing boat 10 constructed as described thus far, maintenance can be performed easily in the steps below. In the first place, the bolt that fixes the flange 31d of the jet pump 30 (See FIG. 3) to the hull 14 is removed, and the jet pump 30 is pulled out toward the rear (in the direction shown by the arrow R). Since the impeller 32 and the shaft 22 are connected only by the splines, the jet pump 30 can be pulled out together with the impeller 32 as a whole, whereby the rear portion (22b) of the shaft 22 is exposed so that the shaft 22 can be held and moved rearward.

As is described above, since the distance L2 that the shaft 22 can be moved toward the rear (in the direction shown by the arrow R) with the driven side coupler 23b and the collar 26 mounted is longer than the length L1 of the engaging portion 23e of the driven side coupler 23b, engagement between the driven side coupler 23b and the drive side coupler 23a is released in the process of moving the shaft 22 toward the rear, so that the driven side coupler 23b comes apart from the drive side coupler 23a. The bolt 24 is then pulled out by holding and rotating the hexagonal nut portion 23c2 of the driven side coupler 23b and the head portion of the bolt 24 by a tool, and then the driven side coupler 23b and the collar 26 can be pulled out from the shaft 22. Therefore, the shaft 22 can be pulled out toward the rear.

Since a workspace can be established behind the drive side coupler 23a, the drive side coupler 23a can be removed from the output shaft 21 by the bolt 21a without removing the engine 20. In this way, maintenance of the shaft 22, the coupler 23, and so on can be performed easily.

As is described thus far, the impeller shaft supporting structure of this small craft is such that the impeller driving shaft 22 in the vessel 10 is supported on the vessel body 11 at the midsection thereof by the bearing member 50. The driven side coupler 23b coupled with the coupler 23a on the side of the output shaft 21 of the engine 20 is mounted on the front end 22a of the shaft 22. Since a collar 26 having a diameter larger than the maximum diameter of the shaft 22 is detachably mounted on the rear of the mounting portion for the driven side coupler 23b, the driven side coupler 23b is fixed with respect to the shaft 22 by abutment between the collar 26 and the driven side coupler 23b so as not to be capable of movement in the thrust direction. According to this coupler mounting structure for vessels, relative movement (and thus relative vibration) between the shaft 22 and the driven side coupler 23b at the mounting portion (22a) of the driven side coupler 23b does not occur, and the durability of the mounting portion of the driven side coupler 23b is improved.

In addition, since the diameter of the collar 26 is larger than the maximum diameter D of the shaft 22, the driven side coupler 23b can be fixedly secured with respect to the shaft 22 by this collar. Since the collar 26 is detachably mounted on the shaft 22, the shaft 22 can be pulled out rearwardly of the vessel body by removing the driven side coupler 23b and the collar 26 from the shaft 22. Therefore, maintenance of the shaft 22 can be performed easily. According to the coupler mounting structure for vessels, durability of the shaft 22 at the mounting portion for the driven side coupler 23b can be improved, and maintenance of the shaft 22 can be performed easily.

FIGS. 7(a)–(b) are views of a principal portion of a second embodiment of the coupler mounting structure for vessels according to the present invention, in which FIG. 7(a) is a side cross sectional view, and FIG. 7(b) is a cross sectional view taken along the line b—b only of the collar portion in the FIG. 7(a). In FIGS. 7(a)–(b), the same parts or corresponding parts with the first embodiment described above are designated by the same reference numerals and signs.

The driven side coupler 23b and the shaft 22 are coupled by screws, and the collar 27 is divided into two pieces in the circumferential direction. In this embodiment, the shaft 22 is formed with a recessed groove 22d in the shape of a ring at the rear of the mounting portion for the driven side coupler 23b, and a collar divided into two halves 27, 27 the diameter of which is larger than the maximum diameter D of the shaft 22 is fitted in this recessed groove 22d. The boss 23c of the driven side coupler 23b and the front end portion of the shaft 22 are formed with threads 23c3, and the driven side coupler 23b is screwed into the shaft 22 until the rear portion of the boss 23c of the driven side coupler 23b abuts strongly against the collar 27 via the washer 28.

Accordingly, the driven side coupler 23b is fixed to the shaft 22 so as not to be movable in the thrust direction. In this embodiment as well, the same beneficial effects as in the first embodiment described above can be achieved. Since the collar 27 is divided into two pieces in the circumferential direction, the collar 27 can easily be removed from the shaft 22, and maintenance of the shaft 22 can be performed easily.

Further, since the driven side coupler 23b and the shaft 22 are screw coupled, the diameter D2 of the power transmitting portion between the driven side coupler 23b and the shaft 22 can be increased, and the length L3 of the power transmitting portion (therefore, the length of the boss 23c) can be reduced correspondingly. Accordingly, the distance L2 that the shaft 22 can be moved rearward with the driven side coupler 23b and the collar 27 mounted (See FIG. 5) can be reduced.

The present invention is not limited to the aforementioned embodiments, and may be modified as appropriate within the range of the spirit and scope of the present invention. For example, the collar 27 may be divided into three or more pieces. Alternatively, the collar 26 may also be divided into two or more pieces.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A coupler mounting structure for vessels in which an impeller driving shaft in the vessel is supported on a midsection of a vessel body by a bearing member and driven by an output shaft of an engine, said coupler mounting structure comprising:
   a driven side coupler being mounted on a front end of the impeller driving shaft;
   a drive side coupler being operatively engaged with the driven side coupler for transmitting a driving force from the engine output shaft; and
   a collar having a diameter larger than a maximum diameter of the impeller driving shaft, said collar being detachably mounted on the impeller driving shaft on a rear side of a mounting portion for the driven side coupler, wherein the driven side coupler is detachably engaged and fixed with respect to the impeller driving shaft by an abutment between the collar and the driven side coupler preventing an axial movement responsive to thrust on the impeller driving shaft, thereby allowing the impeller driving shaft to be pulled out rearwardly of the vessel by removing the driven side coupler and the collar from the impeller driving shaft.

2. The coupler mounting structure according to claim 1, wherein the collar includes at least two pieces divided with respect to a circumferential direction of the impeller driving shaft.

3. A coupler mounting structure for vessels in which an impeller driving shaft in the vessel is supported on a midsection of a vessel body by a bearing member and driven by an output shaft of an engine, said coupler mounting structure comprising:
   a driven side coupler being mounted on a front end of the impeller driving shaft, said driven side coupler including:
      a boss having an inner surface and an outer surface;
      a flange formed integrally with the boss; and
      an engaging portion formed integrally with the flange and projecting toward the driven side coupler;
   a drive side coupler being operatively engaged with the driven side coupler for transmitting a driving force from the engine output shaft; and
   a collar having a diameter larger than a maximum diameter of the impeller driving shaft, said collar being detachably mounted on the impeller driving shaft on a rear side of a mounting portion for the driven side coupler, wherein the driven side coupler is operatively engaged and fixed with respect to the impeller driving shaft by an abutment between the collar and the driven side coupler preventing an axial movement responsive to thrust on the impeller driving shaft.

4. The coupler mounting structure according to claim 3, wherein the boss is formed on the inner surface thereof with a spline connection.

5. The coupler mounting structure according to claim 3, wherein the boss is formed on the inner surface thereof with a spline connection and the impeller driving shaft includes a spline connection on an outer periphery of a front end portion of the impeller driving shaft.

6. The coupler mounting structure according to claim 3, wherein an outer peripheral surface of the boss is formed into the shape of a hexagonal nut.

7. The coupler mounting structure according to claim 5, wherein an outer peripheral surface of the boss is formed into the shape of a hexagonal nut.

8. The coupler mounting structure according to claim 7, wherein the collar includes at least two pieces divided with respect to a circumferential direction of the impeller driving shaft.

9. A coupler mounting structure for a vessel comprising:
   an impeller driving shaft supported on a midsection of a vessel body by a bearing member and driven by an output shaft of an engine;
   a driven side coupler being mounted on a front end of the impeller driving shaft with a mounting portion;
   a drive side coupler being operatively engaged with the driven side coupler for transmitting a driving force from the engine output shaft; and
   a collar having a diameter larger than a maximum diameter of the impeller driving shaft, said collar being detachably mounted on the impeller driving shaft on a rear side of a mounting portion for the driven side coupler, wherein the driven side coupler is detachably engaged and fixed with respect to the impeller driving shaft by an abutment between the collar and the driven side coupler preventing an axial movement responsive to thrust on the impeller driving shaft, thereby allowing the impeller driving shaft to be pulled our rearwardly of the vessel by removing the driven side coupler and the collar from the impeller driving shaft.

10. The coupler mounting structure according to claim 9, wherein the collar includes at least two pieces divided with respect to a circumferential direction of the impeller driving shaft.

11. A coupler mounting structure for a vessel comprising:
   an impeller driving shaft supported on a midsection of a vessel body by a bearing member and driven by an output shaft of an engine;
   a driven side coupler being mounted on a front end of the impeller driving shaft with a mounting portion, said driven side coupler including:
      a boss having an inner surface and an outer surface;

a flange formed integrally with the boss; and an engaging portion formed integrally with the flange and projecting toward the driven side coupler;

a drive side coupler being operatively engaged with the driven side coupler for transmitting a driving force from the engine output shaft; and a collar having a diameter larger than a maximum diameter of the impeller driving shaft, said collar being detachably mounted on the impeller driving shaft on a rear side of a mounting portion for the driven side coupler, wherein the collar includes at least two pieces divided with respect to a circumferential direction of the impeller driving shaft and wherein the driven side coupler is operatively engaged and fixed with respect to the impeller driving shaft by an abutment between the collar and the driven side coupler preventing an axial movement response to thrust on the impeller driving shaft.

12. The coupler mounting structure according to claim 11, wherein the boss is formed on the inner surface thereof with a spline connection.

13. The coupler mounting structure according to claim 11, wherein the boss is formed on the inner surface thereof with a spline connection and the impeller driving shaft includes a spline connection on an outer periphery of a front end portion of the impeller driving shaft.

14. The coupler mounting structure according to claim 11, wherein an outer peripheral surface of the boss is formed into the shape of a hexagonal nut.

15. The coupler mounting structure according to claim 13, wherein an outer peripheral surface of the boss is formed into the shape of a hexagonal nut.

16. The coupler mounting structure according to claim 15, wherein the collar includes at least two pieces divided with respect to a circumferential direction of the impeller driving shaft.

17. The coupler mounting structure according to claim 9, wherein said drive side coupler and said driven side coupler are mounted to said output shaft and said impeller driving shaft, respectively, with a bolt.

18. The coupler mounting structure according to claim 17, further comprising a rubber coupling body integrally fitting between elements of the drive side coupler and the driven side coupler.

* * * * *